(12) United States Patent
Gariepy et al.

(10) Patent No.: US 11,587,033 B2
(45) Date of Patent: Feb. 21, 2023

(54) SYSTEMS AND METHODS FOR AUTONOMOUS PROVISION REPLENISHMENT

(71) Applicant: CLEARPATH ROBOTICS INC., Kitchener (CA)

(72) Inventors: Ryan Christopher Gariepy, Kitchener (CA); Simon Drexler, Puslinch (CA); Roydyn Clayton, Seattle, WA (US)

(73) Assignee: Clearpath Robotics Inc., Kitchener (CA)

( * ) Notice: Subject to any disclaimer, the term of this patent is extended or adjusted under 35 U.S.C. 154(b) by 271 days.

(21) Appl. No.: 17/105,816

(22) Filed: Nov. 27, 2020

(65) Prior Publication Data

US 2021/0081886 A1  Mar. 18, 2021

Related U.S. Application Data

(63) Continuation of application No. 15/936,874, filed on Mar. 27, 2018, now Pat. No. 10,885,495.
(Continued)

(51) Int. Cl.
*G06F 7/00* (2006.01)
*G06Q 10/087* (2023.01)
(Continued)

(52) U.S. Cl.
CPC ....... *G06Q 10/087* (2013.01); *G05B 19/4184* (2013.01); *G05B 19/41865* (2013.01);
(Continued)

(58) Field of Classification Search
CPC .............. G06Q 10/087; G05B 19/4184; G05B 19/41865; G05B 19/41895;
(Continued)

(56) References Cited

U.S. PATENT DOCUMENTS 3,968,559 A   7/1976 Karlsson
5,091,855 A   2/1992 Umehara et al.
(Continued)

FOREIGN PATENT DOCUMENTS

DE   102009024195 A1   12/2010
DE   102010030764 A1   1/2012
(Continued)

OTHER PUBLICATIONS

International Search Report and Written Opinion dated Jul. 5, 2018 in related International Patent Application No. PCT/IB2018/052099 (13 pages).
(Continued)

*Primary Examiner* — Yolanda R Cumbess
(74) *Attorney, Agent, or Firm* — Bereskin & Parr LLP/S.E.N.C.R.L., s.r.l.

(57) ABSTRACT

Systems and methods for autonomous provision replenishment are disclosed. Parts used in a manufacturing process are stored in an intermediate stock queue. When the parts are consumed by the manufacturing process and the number of parts in the queue falls below a threshold, a provision-replenishment signal is generated. One or more self-driving material-transport vehicles, a fleet-management system, and a provision-notification device.

20 Claims, 9 Drawing Sheets

Related U.S. Application Data

(60) Provisional application No. 62/476,960, filed on Mar. 27, 2017.

(51) Int. Cl.
    *G05B 19/418*      (2006.01)
    *G05D 1/02*      (2020.01)

(52) U.S. Cl.
    CPC ..... *G05B 19/41895* (2013.01); *G05D 1/0238* (2013.01); *G05D 1/0291* (2013.01); *G05D 1/0297* (2013.01); *G05D 2201/0216* (2013.01); *Y02P 90/02* (2015.11)

(58) Field of Classification Search
    CPC ........... G05B 2219/31007; G05B 2219/50393; G05D 1/0238; G05D 1/0291; G05D 1/0297; G05D 2201/0216; Y02P 90/02; Y02P 90/60
    USPC .......................................... 700/213–216, 228
    See application file for complete search history.

(56) References Cited

U.S. PATENT DOCUMENTS

| | | | |
|---|---|---|---|
| 6,057,779 | A | 5/2000 | Bates |
| 6,505,093 | B1 | 1/2003 | Thatcher et al. |
| 7,894,933 | B2 | 2/2011 | Mountz et al. |
| 7,931,197 | B2 | 4/2011 | Brandt et al. |
| 7,991,505 | B2 | 8/2011 | Lert, Jr. et al. |
| 8,010,220 | B1 | 8/2011 | Ames et al. |
| 8,311,905 | B1 | 11/2012 | Campbell et al. |
| 8,666,546 | B2 | 3/2014 | Sarh et al. |
| 9,014,902 | B1 | 4/2015 | Murphy |
| 9,486,917 | B2 | 11/2016 | Reid et al. |
| 9,733,646 | B1 | 8/2017 | Nusser et al. |
| 10,304,027 | B1 | 5/2019 | Haque |
| 11,468,400 | B1* | 10/2022 | Kumar ................... G01G 19/40 |
| 2003/0105552 | A1 | 6/2003 | Lunak et al. |
| 2004/0193314 | A1 | 9/2004 | Tilles |
| 2006/0074778 | A1 | 4/2006 | Katou et al. |
| 2008/0319574 | A1 | 12/2008 | Wilke |
| 2009/0326971 | A1 | 12/2009 | Piccinini |
| 2011/0282476 | A1* | 11/2011 | Hegemier ............ G06Q 10/087 705/26.5 |
| 2012/0101627 | A1 | 4/2012 | Lert |
| 2013/0235191 | A1 | 9/2013 | Miao et al. |
| 2014/0074287 | A1 | 3/2014 | Lafary et al. |
| 2014/0100769 | A1 | 4/2014 | Wurman et al. |
| 2014/0172223 | A1 | 6/2014 | Murphy |
| 2014/0365258 | A1 | 12/2014 | Vestal et al. |
| 2015/0314890 | A1 | 11/2015 | DesJardien et al. |
| 2016/0011593 | A1 | 1/2016 | Oberoi et al. |
| 2016/0101940 | A1 | 4/2016 | Grinnell et al. |
| 2016/0124434 | A1 | 5/2016 | Gariepy et al. |
| 2017/0236082 | A1 | 8/2017 | Davidson et al. |
| 2017/0330138 | A1 | 11/2017 | Stoeckel et al. |
| 2018/0029178 | A1 | 2/2018 | Thorwarth |
| 2019/0179329 | A1 | 6/2019 | Keivan et al. |
| 2019/0250641 | A1 | 8/2019 | Beer et al. |
| 2020/0130115 | A1 | 4/2020 | Vetter et al. |
| 2021/0395012 | A1* | 12/2021 | Liu ........................ G06Q 50/28 |

FOREIGN PATENT DOCUMENTS

| | | |
|---|---|---|
| WO | WO0125796 A1 | 4/2001 |
| WO | 2011093813 A1 | 8/2011 |
| WO | 2016012742 A1 | 1/2016 |

OTHER PUBLICATIONS

Boca et al.;Ultra-Flexible Production Systems for Automated Factories; 2016 IEEE International Conference on Automation Science and Engineering (CASE) Fort Worth, TX, USA, Aug. 21-24, 2016; pp. 614-619 (Year: 2016).

\* cited by examiner

SYSTEMS AND METHODS FOR AUTONOMOUS PROVISION REPLENISHMENT

CROSS-REFERENCE TO RELATED APPLICATIONS

This application is a continuation of U.S. patent application Ser. No. 15/936,874, filed Mar. 27, 2018 which claims priority from U.S. Provisional Patent Application No. 62/476,960, filed Mar. 27, 2017, the contents of which are incorporated herein by reference.

FIELD

The described embodiments relate to provision replenishment in industrial manufacturing, and in particular, to systems and methods for autonomous provision replenishment.

BACKGROUND

Industrial manufacturing processes rely on the replenishment of provisions that are consumed during the manufacturing process. For example, an assembly line whose product is a finished good consumes individual parts that are assembled into the finished good. The parts are taken from a storage location, provided to the assembly line at an appropriate time and place, and are then consumed into the assembly of the finished good.

The process by which parts are provided to the assembly line can have a significant impact on the overall efficiency and productivity of the manufacturing process. In light of this impact, various processes may be used. In some processes, the parts may be stored in a storage location away from the assembly line, and then brought to a temporary location, such as a staging or pre-assembly point, so that the parts may be readily available to the assembly line. As such, a key criterion for determining the efficiency of the overall manufacturing process is the number of individual parts that are stored in a buffer or queue prior to being consumed by the manufacturing process. Generally, the smaller the buffer or queue, the more efficient the manufacturing process.

Such a process may serve to limit the queue of parts stored at the staging or pre-assembly point. As the limit of the queue decreases, the process tends towards a "just-in-time" process, in which the parts consumed by the process are delivered to the process just in time for their consumption. However, even in a just-in-time process, there is a need to maintain at least a small queue of parts in order to account for uncertainties in the process, including uncertainties in the delivery of the parts from the storage location.

Furthermore, the process of delivering parts from a storage location to the queue may be shared among different stages of the same overall manufacturing process. For example, the same forklift and operator that delivers a particular part for a particular stage in the manufacturing process may also deliver a different part to a different stage in the manufacturing process.

In view of the above, the overall efficiency and productivity of a manufacturing process can be improved by a combination reducing uncertainties in the delivery of parts to a particular queue, as well as by allocating the delivery process resources across multiple queues.

SUMMARY

In one aspect, there is provided a method for autonomous provision replenishment. The method comprises receiving a provision-replenishment signal having an item identifier associated with an item to be replenished, and a drop-off location. A pick-up location associated with the item identifier is retrieved from a memory. A self-driving material-transport vehicle, having a processor, receives the item identifier, the pick-up location, and the drop-off location. Based on the pick-up location, the processor determines a pick-up path. The vehicle moves along the pick-up path towards the pick-up location. At the pick-up location, the vehicle receives an item associated with the item identifier. The processor then determines a drop-off path based on the drop-off location. The provision-replenishment signal is generated in response to the consumption of at least one item of the item type in a manufacturing process.

According to some embodiments, the provision-replenishment signal is received by the self-driving material-transport vehicle.

According to some embodiments, the provision-replenishment signal is received by a fleet-management system.

According to some embodiments, the method further comprises, after the pick-up path has been determined, using a sensor on the vehicle to sense an obstruction that is obstructing the pick-up path. The processor the determines an updated pick-up path based on the pick-up location and the obstruction, and then the vehicle moves along the updated pick-up path towards the pick-up location.

According to some embodiments, the method further comprises, after the drop-off path has been determined, using a sensor on the vehicle to sense an obstruction that is obstructing the drop-off path. The processor determines an updated drop-off path based on the drop-off location and the obstruction, and then the vehicle moves along the updated drop-off path towards the drop-off location.

According to some embodiments, the method comprises the preliminary steps of counting a quantity of items of the item type at the drop-off location, and determining whether the quantity of items is below a threshold. The provision-replenishment signal is then generated, based on determining that the quantity of items is below the threshold.

According to some embodiments, the method comprises the preliminary steps of generating the provision-replenishment signal based on the activation of a user-input device at an assembly location. The item identifier is associated with the user-input device, and the drop-off location is associated with the assembly location.

In another aspect, there is provided a method for autonomous provision replenishment. The method comprises using a fleet-management system to generate a first mission based on a first provision-replenishment signal having an associated first pick-up location and a first drop-off location. The first mission is transmitted from the fleet-management system to a self-driving material-transport vehicle. The mission is then executed by the vehicle. The fleet-management system is used to generate a second mission based on a second provision-replenishment signal having an associated second pick-up location and a second drop-off location. The second mission is transmitted from the fleet-management system to the self-driving material-transport vehicle. The second mission is then executed by the vehicle. The first provision-replenishment signal is generated in response to a first item of a first item type being consumed, and the second provision-replenishment signal is generated in response to a second item of a second item type being consumed. The first pick-up location and the second pick-up location are not associated by a common path by a fleet-management system prior to the generation of the second mission.

In another aspect, there is provided a system for autonomous provision replenishment.

In another aspect, there is provided a method for autonomous provision replenishment. The system comprises a least one self-driving material-delivery vehicle having a control system, a provision-replenishment signal device for generating and transmitting a provision-replenishment signal, and a fleet-management system in communication with the provision-replenishment system and the at least one vehicle. The fleet-management system has a processor configured to receive the provision-replenishment signal, determine a pick-up location based on the provision-replenishment signal, and transmit the pick-up location to the at least one vehicle. The control system is configured to plan a pick-up path to the pick-up location and drive the vehicle along the pick-up path. The provision-replenishment signal is generated in response to an item being consumed in a manufacturing process.

According to some embodiments, the processor if configured to determine a drop-off location based on the provision-replenishment signal, and generate a mission based on the pick-up location and the drop-off location. Transmitting the pick-up location comprises transmitting the mission to the vehicle.

According to some embodiments, the control system is further configured to plan a drop-off path to the drop-off location based on the mission, and drive the vehicle along the drop-off path.

According to some embodiments, the at least one vehicle comprises at least two vehicles. The processor is further configured to select a selected vehicle from the at least two vehicles. Transmitting the pick-up location comprises transmitting the pick-up location to the selected vehicle. The control system is configured to plan the pick-up path is the control system of the selected vehicle.

In another aspect, there is provided a method for autonomous provision replenishment. A provision-replenishment signal is received with a fleet-management system. The signal has an item identifier associated with an item type to be replenished, and a drop-off location. A pick-up location associated with the item identifier is retrieved from a memory. The item identifier, the pick-up location, and the drop-off location are received with a processor on a self-driving material-transport vehicle. The processor is used to determine a pick-up path based on the pick-up location. The vehicle is moved along the pick-up path towards the pick-up location. The vehicle then receives an item associated with the item identifier at the pick-up location. The processor is then used to determine a drop-off path based on the drop-off location, and the vehicle is moved along the drop-off path towards the drop-off location. The provision-replenishment signal is generated in response to at least one item of the item type being consumed in a manufacturing process.

In another aspect, there is provided a method for autonomous provision replenishment with a self-driving vehicle. The method comprises sensing a provision-replenishment notice on a provision-replenishment board using a sensor of the self-driving vehicle, and determining an item identifier based on the provision-replenishment notice, and then transmitting the item identifier from the vehicle to an enterprise resource planning system.

According to some embodiments, the provision-replenishment notice is a Kanban card.

According to some embodiments, determining the item identifier comprises capturing an image of a Kanban card and comparing the image to a known template image.

According to some embodiments, the method further comprises receiving a pick-up location from the enterprise resource planning system with the vehicle.

According to some embodiments, the method further comprises planning a pick-up path to the pick-up location with the vehicle.

In another aspect, there is provided a method for configuring an intermediate stocking queue in a manufacturing process. A provision-replenishment signal is generated with a provision-notification station in response to the consumption of an item from an item from the intermediate stocking queue in the manufacturing process. The provision-replenishment signal is received with a fleet-management system, and a mission is generated based on the provision-replenishment signal. The mission is transmitted to a self-driving material-transport vehicle, and the vehicle executes the mission. At least one item is delivered to the intermediate stocking queue using the vehicle, according to the mission. A confirmation signal is transmitted to the fleet-management system from the vehicle to confirm that the at least one replenishment part was delivered. The fleet-management system calculates a delivery time based on the provision-replenishment signal and the confirmation signal. A replenishment threshold is determined for the intermediate stocking queue based on the delivery time.

According to some embodiments, the replenishment threshold is determined based on a consumption rate of the manufacturing process.

According to some embodiments, the method further comprises the initial step of recording an initial replenishment-threshold value, and subsequently recording an updated replenishment-threshold value based on the initial replenishment-threshold value and the replenishment threshold.

BRIEF DESCRIPTION OF THE DRAWINGS

A preferred embodiment of the present invention will now be described in detail with reference to the drawings, in which.

DESCRIPTION OF EXEMPLARY EMBODIMENTS

Figure 1:
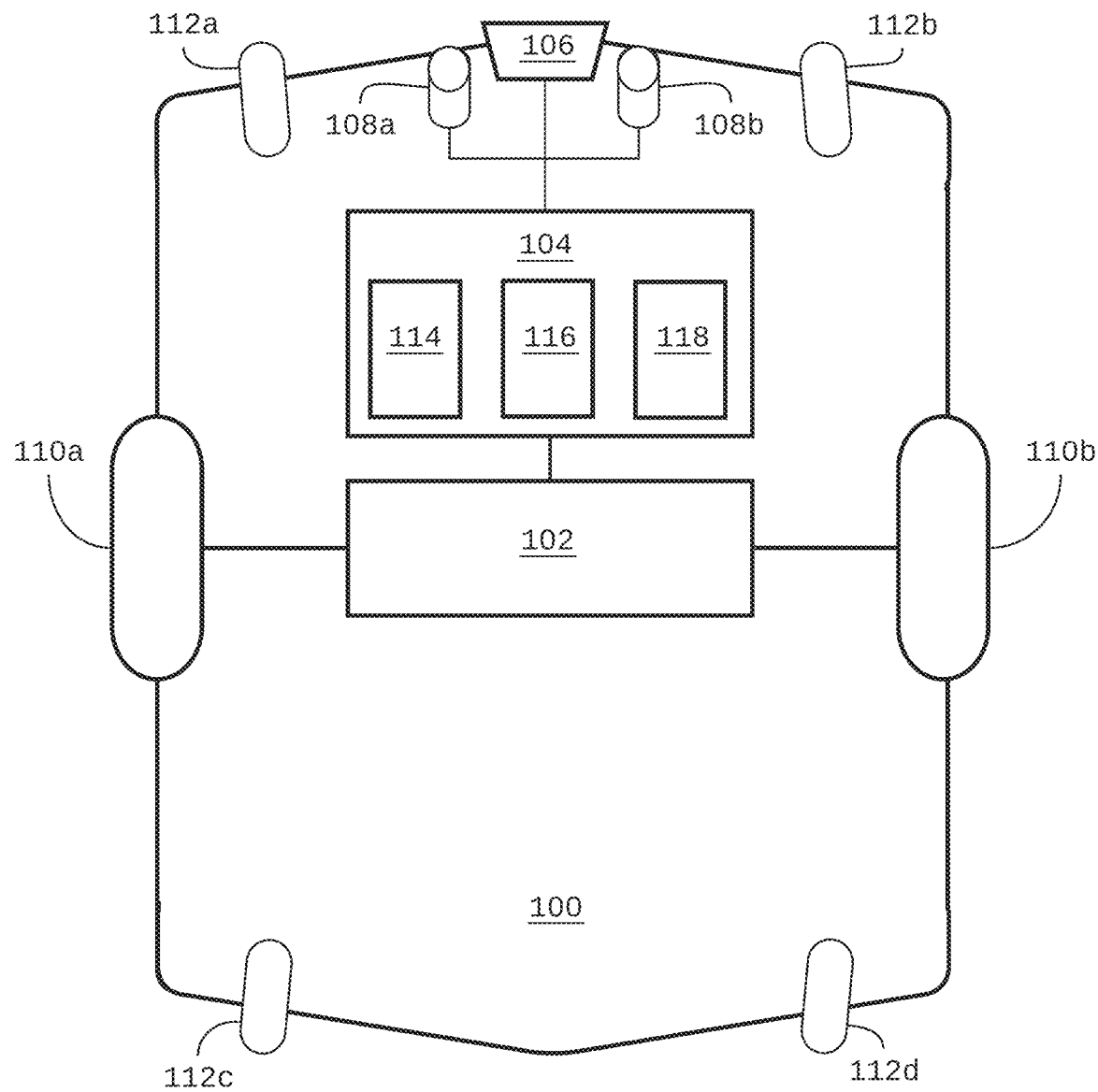
FIG. 1 is a system diagram of a self-driving material-transport vehicle, according to some embodiments.

Referring to FIG. 1, there is shown a self-driving material-transport vehicle 100 according to some embodiments.

The vehicle comprises a drive system 102, a control system 104, and one or more sensors 106, 108a, and 108b.

The drive system 102 includes a motor and/or brakes connected to drive wheels 110a and 110b for driving the vehicle 100. According to some embodiments, the motor may be an electric motor, combustion engine, or a combination/hybrid thereof. Depending on the particular embodiment, the drive system 102 may also include control interfaces that can be used for controlling the drive system 102. For example, the drive system 102 may be controlled to drive the drive wheel 110a at a different speed than the drive wheel 110b in order to turn the vehicle 100. Different embodiments may use different numbers of drive wheels, such as two, three, four, etc.

According to some embodiments, additional wheels 112 may be included (as shown in FIG. 1, the wheels 112a, 112b, 112c, and 112d may be collectively referred to as the wheels 112). Any or all of the additional wheels 112 may be wheels capable of allowing the vehicle 100 to turn, such as castors, omni-directional wheels, and mecanum wheels.

The control system 104 comprises a processor 114, a memory 116, and a computer-readable non-transitory medium 118. According to some embodiments, the control system 104 may also include a communications transceiver (not shown in FIG. 1), such as a wireless transceiver for communicating with a wireless communications network (e.g. using an IEEE 802.11 protocol or similar).

One or more sensors 106, 108a, and 108b may be included in the vehicle 100. For example, according to some embodiments, the sensor 106 may be a LiDAR device (or other optical/laser, sonar, or radar range-finding sensor). The sensors 108a and 108b may be optical sensors, such as video cameras. According to some embodiments, the sensors 108a and 108b may be optical sensors arranged as a pair in order to provide three-dimensional (e.g. stereo or RGB-D) imaging.

The control system 104 uses the medium 118 to store computer programs that are executable by the processor 114 (e.g. using the memory 116) so that the control system 104 can provide automated or autonomous operation to the vehicle 100. Furthermore, the control system 104 may also store an electronic map that represents the known environment of the vehicle 100, such as a manufacturing facility, in the media 118.

For example, the control system 104 may plan a path for the vehicle 100 based on a known destination location and the known location of the vehicle. Based on the planned path, the control system 104 may control the drive system 102 in order to drive the vehicle 100 along the planned path. As the vehicle 100 is driven along the planned path, the sensors 106, and/or 108a and 108b may update the control system 104 with new images of the vehicle's environment, thereby tracking the vehicle's progress along the planned path and updating the vehicle's location.

Since the control system 104 receives updated images of the vehicle's environment, and since the control system 104 is able to autonomously plan the vehicle's path and control the drive system 102, the control system 104 is able to determine when there is an obstacle in the vehicle's path, plan a new path around the obstacle, and then drive the vehicle 100 around the obstacle according to the new path.

According to some embodiments, the vehicle 100 may receive a mission from a fleet-management system or other external computer system in communication with the vehicle 100 (e.g. in communication via the transceiver in the control system 104). In this case, the mission contains one or more waypoints or destination locations. Based on the waypoint or destination location contained in the mission, the vehicle 100, based on the control system 104, can autonomously navigate to the waypoint or destination location without receiving any other instructions from an external system. For example, the control system 104, along with the sensors 106, and/or 108a, and 108b, enable the vehicle 100 to navigate without any additional navigational aids such as navigational targets, magnetic strips, or paint/tape traces installed in the environment in order to guide the vehicle 100.

Figure 2:
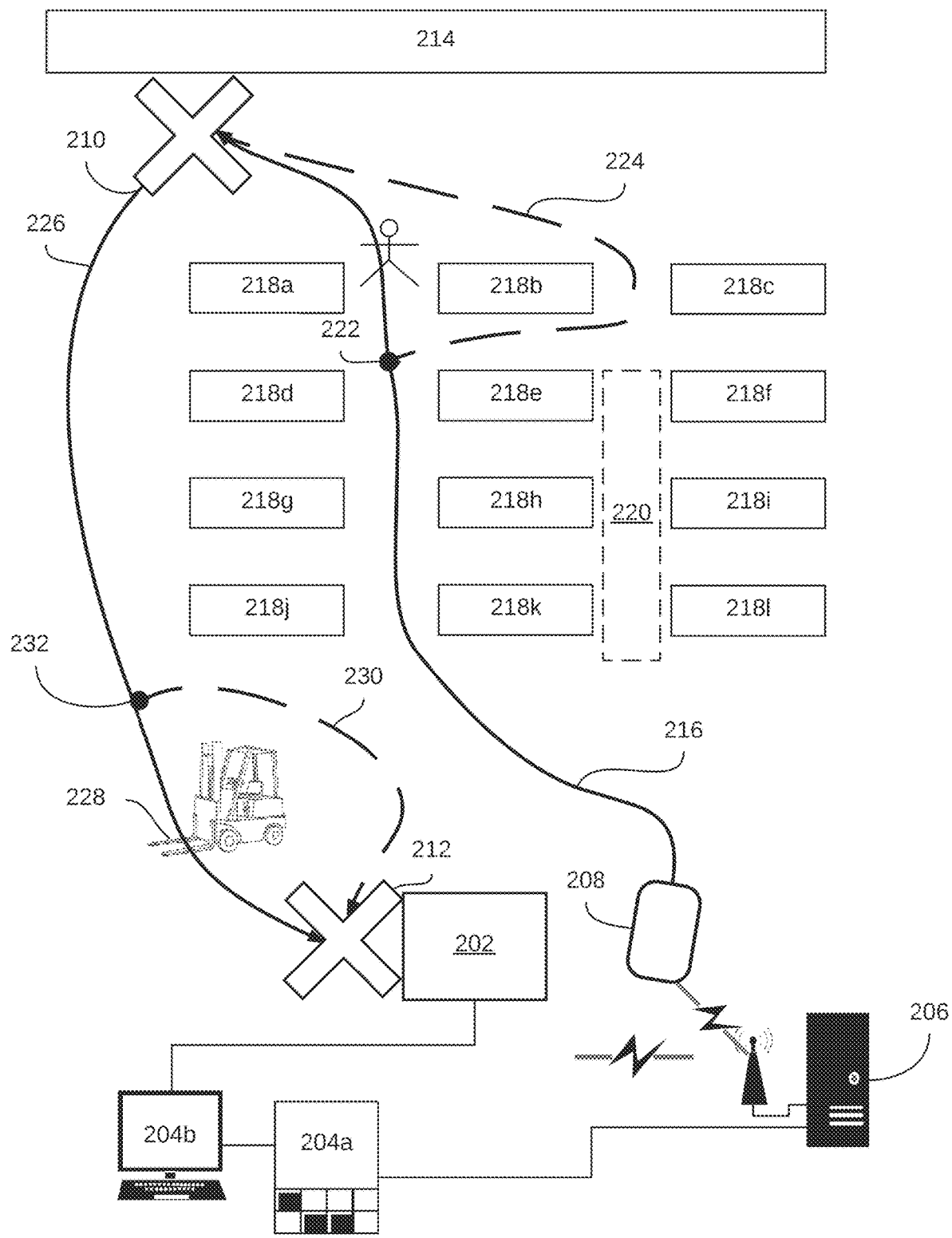
FIG. 2 is a plan view of a system for autonomous provision replenishment in a manufacturing facility according to some embodiments.

Referring to FIG. 2, there is shown a manufacturing facility 200 in which a manufacturing process (e.g. an assembly line) is operating. The manufacturing process is run in an attempt to achieve a "lean" or "just-in-time" process, by queueing parts for consumption in the manufacturing process in intermediate stocking queue associated with a particular step in the process.

An intermediate stocking queue 202 is associated with a particular type of part that is consumed at a particular step in the manufacturing process. The intermediate stocking queue 202 may be one of many intermediate stocking queues that may be located elsewhere within the manufacturing facility 200. The intermediate stocking queue 202 serves as a temporary storage location for the particular type of parts that will be consumed. According to some embodiments, a single intermediate stocking queue 202 may be associated with a single type of parts, whereas, in other embodiments, a single intermediate stocking queue 202 may be associated with more than one type of parts. For example, a particular type of bolt and a corresponding nut may be required for use in a particular stage in an assembly line. Thus, while there may be a large repository of nuts and bolts stored in inventory elsewhere in the facility 200, the intermediate stocking queue 202 can store enough nuts and/or bolts to maintain a constant supply to the assembly line, and in a location that is more convenient to the assembly line than the large inventory repository.

Operation of the intermediate stocking queue 202 (and, by association, operation of the manufacturing process) can be optimized by defining a queue limit and a replenishment threshold for the intermediate stocking queue 202. The queue limit defines the preferred maximum number of parts that are temporarily stored at the intermediate stocking queue 202. The replenishment threshold defines the number of parts remaining at the intermediate stocking queue 202 at which the intermediate stocking queue 202 should be replenished. Thus, ideally, when the intermediate stocking queue 202 is replenished, the number of parts at the intermediate stocking queue 202 is equal to the queue limit. When parts are consumed from the intermediate stocking queue 202 by the manufacturing process, the number of parts at the intermediate stocking queue 202 is decremented accordingly. When the number of parts is equal (or fewer than) the replenishment threshold, there is a need to replenish the intermediate stocking queue 202.

The facility 200, as shown in FIG. 2, includes a provision-notification board 204a and a provision-notification computer terminal 204b (collectively referred to as "provision-notification station 204"), which may be located near the intermediate stocking queue 202 as shown. When the number of parts at the intermediate stocking queue 202 is at or below the replenishment threshold, a signal is generated at the provision-notification station 204. According to some embodiments, one or both of the provision-notification board 204a and the provision-notification terminal 204b may be used.

According to some embodiments, the provision-notification board 204a may be a "Kanban" board. In this case, when the number of parts at the intermediate stocking queue 202 is at or below the replenishment threshold, a human operator may post a Kanban card on the Kanban board that indicates the type of parts that need to be replenished. In order to utilize the Kanban board within an autonomous provision replenishment system or methods, the information from the Kanban card must be communicated to a fleet-management system 206. This may be accomplished, for example, when a human operator inputs the information from the Kanban card into the provision-notification terminal 204b. In some cases, the provision-notification terminal 204b may serve as a "Kanban" board itself (e.g. an electronic Kanban board), such that a human operator may input the information directly into the terminal 204b without the need for a board 204a.

According to some embodiments, the provision-notification station may comprise a button that a human operator can activate in order to automatically generate a provision-replenishment signal. For example, the button may be associated with a single intermediate stocking queue 202 and a single item type such that activating the button automatically generates a provision-replenishment signal associated the item type and the intermediate stocking queue 202.

According to some embodiments, an autonomous vehicle equipped with optical sensors may be used to read information from a Kanban card that has been placed on the provision-notification board 204a. In other words, an autonomous vehicle can effectively serve as a provision-notification terminal 204b. Such a vehicle may be used primarily for scanning Kanban cards, and/or such a vehicle may be instructed to scan Kanban cards that it encounters while fulfilling other primary missions such as provision replenishment.

According to some embodiments, the location of the intermediate stocking queue 202 may be equipped with a device or system for automatically counting the number of parts remaining in the queue. For example, such a device or system may measure the mass of the parts remaining in the queue, and, based on the known mass of a single part, may determine the number of parts remaining. In another example, such a device or system may read identification information pertaining to each part so that the number of parts in the queue can be incremented by scanning replenishment parts coming into the queue, and decremented by scanning parts leaving the queue for consumption by the production process.

When the number of parts at the intermediate stocking queue 202 is at or below a replenishment threshold, then a provision-replenishment signal is sent to the fleet-manager system 206.

As used here, the term "provision-replenishment signal" can mean any or all of (including combinations of) a physical Kanban card, an electronic Kanban card, information input to a terminal 204b, information input to or generated by an enterprise resource planning system ("ERP"), or a signal transmitted to the fleet-management server 206 that includes a request for provision replenishment associated with a particular type of part or item.

According to some embodiments, an enterprise resource planning system may operate, for example on the terminal 204b or another system. In this case, the enterprise resource planning system may serve as an intermediate or interface between counting the parts at the intermediate stocking queue 202 and the fleet-management system 206.

The fleet-management system 206 is a computer system having a processor, memory, non-transitory computer-readable media, and a transceiver (e.g. a wireless transceiver) for communicating with a communications network. The fleet-management system 206 uses the media to store computer programs that are executable by the processor (e.g. using the memory) so that the fleet-management system 206 can communicate information with other system, and communicate with a self-driving material-transport vehicle 208 in order to generate and communicate missions for the vehicle 208.

When a provision-replenishment signal is received by the fleet-management system 206, the fleet-management system 206 prepares to generate a mission based on the provision-replenishment signal, to send to the vehicle 208.

The fleet-management system 206 determines a pick-up location 210 (shown with a large "X" as if on a map of the facility 200) where items of the particular item type are stored and available for pick up. According to some embodiments, the item type and/or the pick-up location 210 may be provided by the provision-replenishment signal (e.g. retrieved from the memory of the terminal 204b). According to some embodiments, the provision-replenishment signal may provide an item identifier, and the fleet-management system 206 may retrieve the associated item type and/or pick-up location 210 from a memory or non-transient computer-readable medium on the fleet-management system 206 or another computer system (e.g. an enterprise resource planning system) in communication with the fleet-management system 206.

According to some embodiments, the mission generated by the fleet-management system 206 may include any or all of the item identifier, item type, pickup-up location 210, and drop-off location 212 (shown with a large "X" as if on a map of the facility 200). As depicted in FIG. 2, the drop-off location 212 is adjacent the intermediate stocking queue 202. For example, the drop-off location 212 may be adjacent the intermediate stocking queue 202 so that, when the vehicle 208 is at the drop-off location 212, items can be unloaded from the vehicle 208 and placed on (or in) the intermediate stocking queue 202, such as by using human or machine labor.

According to some embodiments, the drop-off location 212 may be the same as the location of the intermediate stocking queue 202. For example, the vehicle 208 itself may serve as a platform for the intermediate stocking queue 202 such that items can be moved directly from the vehicle 208 to be consumed by the manufacturing process.

The vehicle 208 may be located anywhere within the facility 200 when it receives a mission from the fleet-management system 206. As depicted in FIG. 2, the vehicle 208 has received a mission from the fleet-management system 206, which includes instructions to travel to the pick-up location 210 in order to pick up an item from the shelf 214, and drop off the item at the drop-off location 212.

In order to travel to the pick-up location 210, the vehicle 208 uses a map of the facility 200 stored on the control system of the vehicle 208. Based on the map, the control system of the vehicle 208 plans a pick-up path 216 (indicated by the solid line from the location of the vehicle 208 to the pick-up location 210).

The pick-up path initially planned by the vehicle 208 includes routing for a preferred path through shelving units 218a through 218l (collectively "the shelving units 218), as well as an identified zone 220. According to some embodiments, the zone 220 may be stored as a part of the map in the control system of the vehicle 208. According to some embodiments, the location of the zone 220 may be provided to the vehicle 208 by the fleet-management system 206, for example, as a part of a periodic update.

The identified zone 220 may indicate an area within the facility 214 that requires special navigational consideration by the vehicle 208. For example, the zone 220 may indicate that the vehicle 208 cannot pass through the zone, because the zone is closed or blocked for traffic. The zone may also indicate that the vehicle 208 can pass through the zone, but at a reduced speed. The zone 220 may be identified on a temporary and/or periodic basis. For example, if there is known vehicle congestion in an area of the facility 200, then the area may be identified as a zone, and then the identified zone may be altered or removed when the congestion has dissipated. Furthermore, zones may be identified according to a schedule, such as, when a particular zone is used for human traffic during the human workers' shift change, or when there is a scheduled delivery of inventory being unloaded in a particular area.

Generally, the path 216 represents the optimized path planned from the location of the vehicle 208 when the mission is received from the fleet-management system 206, to the pick-up location 210. In execution of the mission, the vehicle 208 begins to travel along the pick-up path 216 towards the pick-up location 210.

In the example provided in FIG. 2, as the vehicle 208 travels along the pick-up path 216, a human being walks between the shelf 218a and the shelf 218b, thereby obstructing the pick-up path 216. The vehicle 208, using its sensors, detects the human ("obstruction") when the vehicle is at the location 222. Upon detecting the obstruction, the control system of the vehicle 208 plans an updated pick-up path 224 (shown as a dashed line) in order to route the vehicle 208 from the location 222 to the pick-up location 210, around the obstruction.

When the vehicle 208 arrives at the pick-up location 210, it receives an item, for example, that was stored in inventory on the shelf 214. The control system of the vehicle 208 plans a drop-off path 226 from the location of the vehicle 208 (at or near the pick-up location 210) to the drop-off location 212.

In the example shown in FIG. 2, as the vehicle 208 travels towards the drop-off location 212 a forklift 228 ("obstruction") crosses the path of the vehicle 208. In response to the obstruction, the control system of the vehicle 208 plans an updated drop-off path 230 from the location 232 to the drop-off location 212.

When the vehicle 208 arrives at the drop-off location 212, the item(s) received by the vehicle 208 at the pick-up location 210 are unloaded in order to replenish the intermediate stocking queue 202. Once the item(s) has been added to the intermediate stocking queue 202, the item is available for consumption by the manufacturing process.

Figure 3:
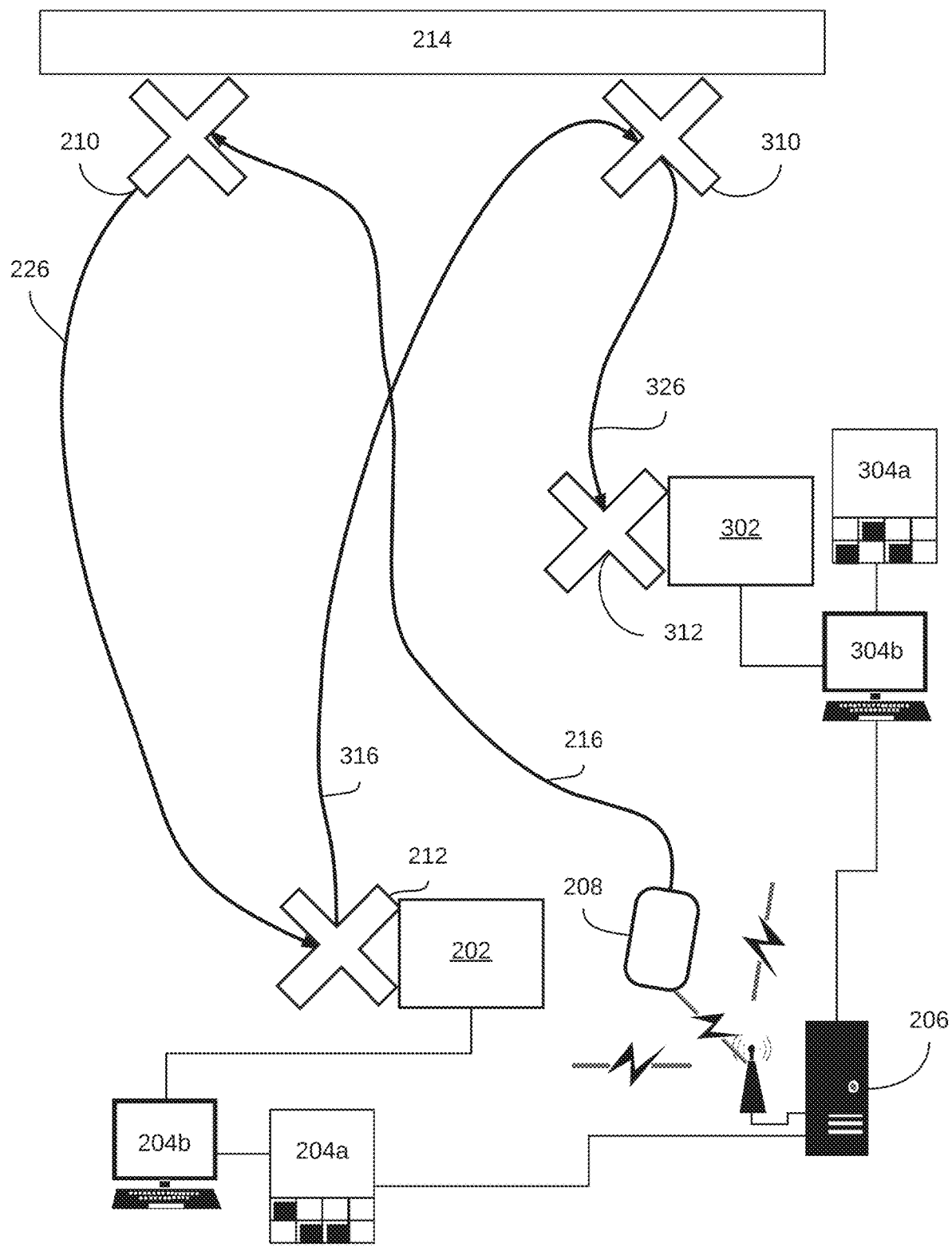
FIG. 3 is a plan view of a system for autonomous provision replenishment in a manufacturing facility according to some embodiments.

Referring to FIG. 3, there is shown the facility 200 according to some embodiments. The facility 200 is the same as shown in FIG. 2, except that certain items (e.g. shelving units 218) have been removed for simplicity of explanation. In addition to what is shown in FIG. 2, the facility 200 as shown in FIG. 3 includes a second intermediate stocking queue 302, a second provision-notification board 304a and a second provision-notification computer terminal 304b (collectively referred to as the second "provision-notification station 304"), in accordance with what was previously described for the intermediate stocking queue 202, and the provision notification stations 204.

As previously described, the vehicle 208 receives a mission from the fleet-management system 206. According to the mission, the vehicle 208 travels along a pick-up path 216 to the pick-up location 210, receives an item from the inventory shelf 214, travels along a drop-off path 226 to a drop-off location 212, and unloads the item to the intermediate stocking queue 202.

At a time that may be after the vehicle 208 has started to travel along the pick-up path 216 (or before), an item is consumed from the intermediate stocking queue 302 that triggers a new replenishment signal from the provision-notification station 304 to the fleet-management system 206.

Subsequently, the fleet-management system 206 generates a new mission, and the vehicle 208 receives the new mission from the fleet-management system 206. According to this new mission, the vehicle 208 plans a new pick-up path 316 based on the location of the vehicle 208 (e.g. at or around the drop-off location 202) and a new pick-up location 310. The vehicle 208 follows the new pick-up path 316 to the new pick-up location 310, and receives a new item or items. It is not necessary that the new pick-up location 310 and/or new item have any association with the shelf 214. Rather, the pick-up location 310 could be anywhere in the facility 200.

Once the new item has been received by the vehicle 208 at the new pick-up location 310, the vehicle 208 plans a new drop-off path 326 from the location of the vehicle 208 (at or around the new pick-up location 310) to a new drop-off location 312, whereat, the new item is unloaded from the vehicle 208 to the intermediate stocking queue 302, where it become available for consumption by the manufacturing process.

In this way, autonomous provision replenishment can be provided to more than one stage of a manufacturing process (i.e. more than one type of item and/or more than one intermediate stocking queue) using a single vehicle 208, without any limitations of assigning a particular vehicle to a particular pick-up location or drop-off location. This is not possible, for example, using an automated guided vehicle ("AGV") that requires specific infrastructure such as a magnetic strip to be pre-determined between particular pick-up and drop-off locations, since the infrastructure must be pre-determined to connect a specific pick-up location with a specific drop-off location, and vehicle can not deviate from the pre-determined path. Similarly, this is not possible with vehicle driven by human operators, since a particular manufacturing facility and/or inventory area may be too large for a human operator to sufficiently learn the location of every pick-up location and drop-off location in order to be efficient in delivering parts to intermediate stocking queues in a "just-in-time" manner.

Other embodiments are similarly contemplated in which two different vehicles may deliver the same type of parts from one pick-up location 210 to one drop-off location 212 over time. For example, if a new provision-replenishment signal is generated by the provision-notification station 204 while the vehicle 208 is travelling along the pick-up path 316 towards the pick-up location 310, the fleet-management system 206 may select a different vehicle (i.e. not the vehicle 208 shown) in order to execute the new mission.

Referring to FIG. 4 to FIG. 9, there are shown various methods related to autonomous provision replenishment. According to some embodiments, these methods may be stored as computer instructions stored on non-transitory computer-readable media on any or all of a self-driving material-transport vehicle, a fleet-management system, and an enterprise resource planning system. Each of the vehicle, fleet-management system, and enterprise resource planning system include at least one processor and memory such that the computer instructions can be used to configure the processors to execute any or all of the steps of the following methods. According to some embodiments, any or all of the methods 400, 500, 550, 700, 800, and 900 may be run concurrently, sequentially, in parallel, or responsive to each other.

Figure 4:
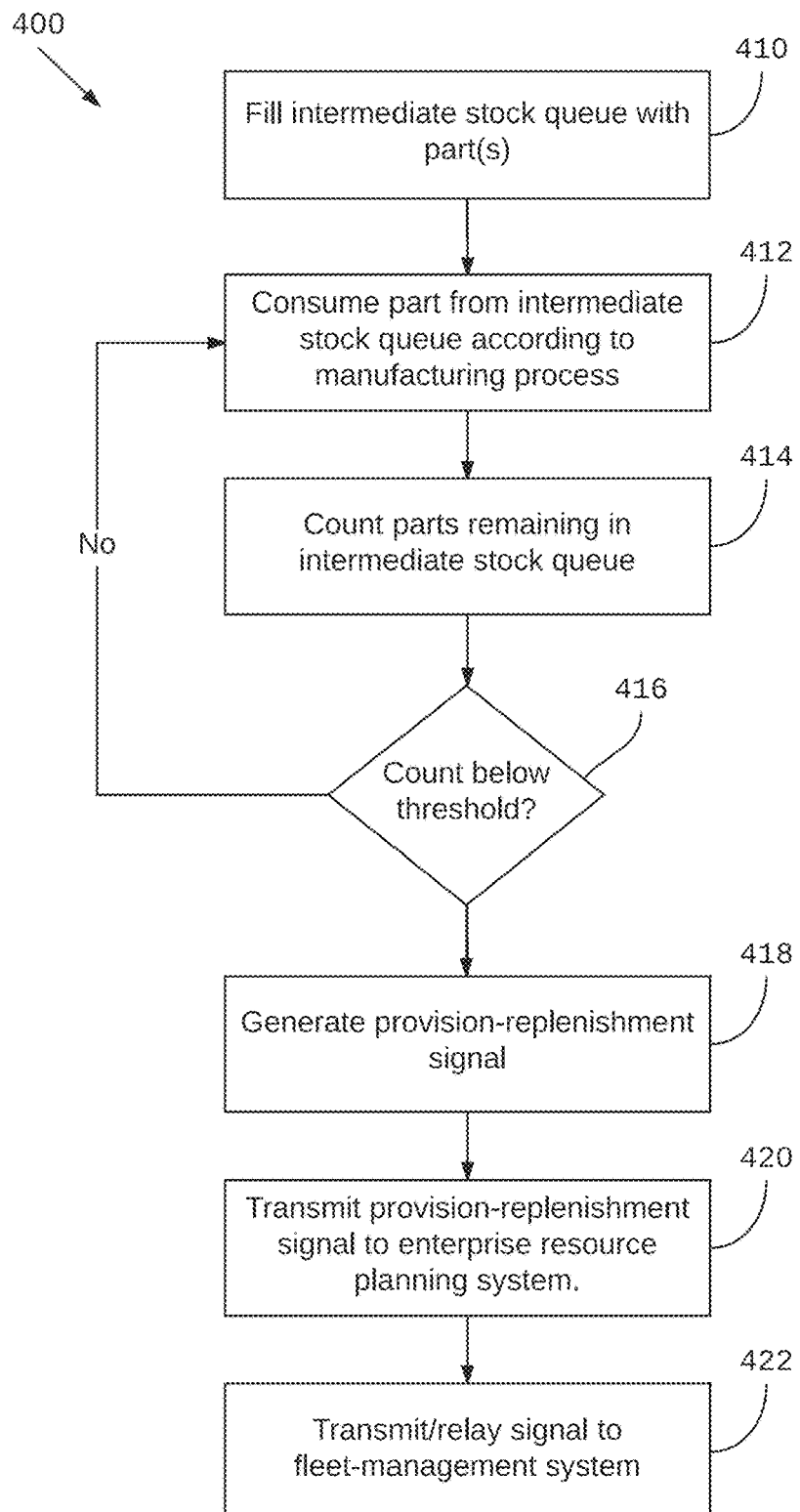
FIG. 4 is a flow diagram of a method for autonomous provision replenishment according to some embodiments.

Referring to FIG. 4, there is shown a method 400 for autonomous provision replenishment according to some embodiments.

The method begins at step 410, when an intermediate stocking queue is filled with parts (i.e. the queue is at its queue limit). At step 412, a part is removed from the queue and is consumed according to a manufacturing process. For example, if the manufacturing process is an automobile assembly line, and the part is a muffler, then the muffler is "consumed" when it is installed on an automobile on the assembly line.

After the part has been consumed from the queue, then, at step 414, the parts in the queue are counted. For example, if the previous count is known, then counting the parts after the consumption may be accomplished by decrementing the previous count. According to some embodiments, at each pass through the step 410, the count is set to the queue limit, or another value, depending on how many items have been replenished in the queue.

At step 416, the method compares the count value from the step 414 and compares it to a replenishment threshold. The replenishment threshold represents the value at which it has been determined that the queue should be replenished. If the count value from the step 414 is not below the threshold, then the method returns to the step 412 and another part is iteratively consumed from the queue. If, at step 416, it is determined that the count is below the threshold, then the method 400 proceeds to step 418.

At step 418, in response to the consumption of the part during the step 414, a provision-replenishment signal is generated. According to some embodiments, the provision-replenishment signal may be generated based on the particular location of the queue relative to the manufacturing process, the type of item to be replenished in the queue, and/or another unique identifier of the queue itself.

According to some embodiments, generating the provision-replenishment signal may include a human operator manually posting a provision notification (e.g. posting a Kanban card on a Kanban board) and then subsequently, another operator inputting the posted information into a provision-notification terminal (e.g. by scanning a Kanban card), directly entering the provision-notification information into a provision-notification terminal, or automatically generating the provision-replenishment signal using a computer in communication with an automated parts counter at the queue.

At step 420, the provision-replenishment signal is transmitted to an enterprise resource planning system. For example, according to some embodiments, the enterprise resource planning system may be used to receive the item identifier and/or item type, and then determine an associated item type, storage location, pick-up location, etc.

At step 422, a signal is sent from the enterprise resource planning system to the fleet-management system. According to some embodiments, this may include relaying information to the fleet-management system. In some embodiments, this may include identifying new information with the enterprise resource planning system associated with the provision-replenishment signal, and then transmitting the new information to the fleet-management system.

For example, if the provision-replenishment signal includes the pick-up location, then the pick-up location may be relayed to the fleet-management system. If the provision-replenishment signal includes an item type but does not include the pick-up location, then the enterprise resource planning system may retrieve the pick-up location from its memory/media, and transmit the pick-up location to the fleet-management system.

According to some embodiments, the steps 420 and 422 may be combined, and/or at step 420, the provision-replenishment signal may be transmitted directly to the fleet-management system without first transmitting to the enterprise resource planning system.

Figure 5:
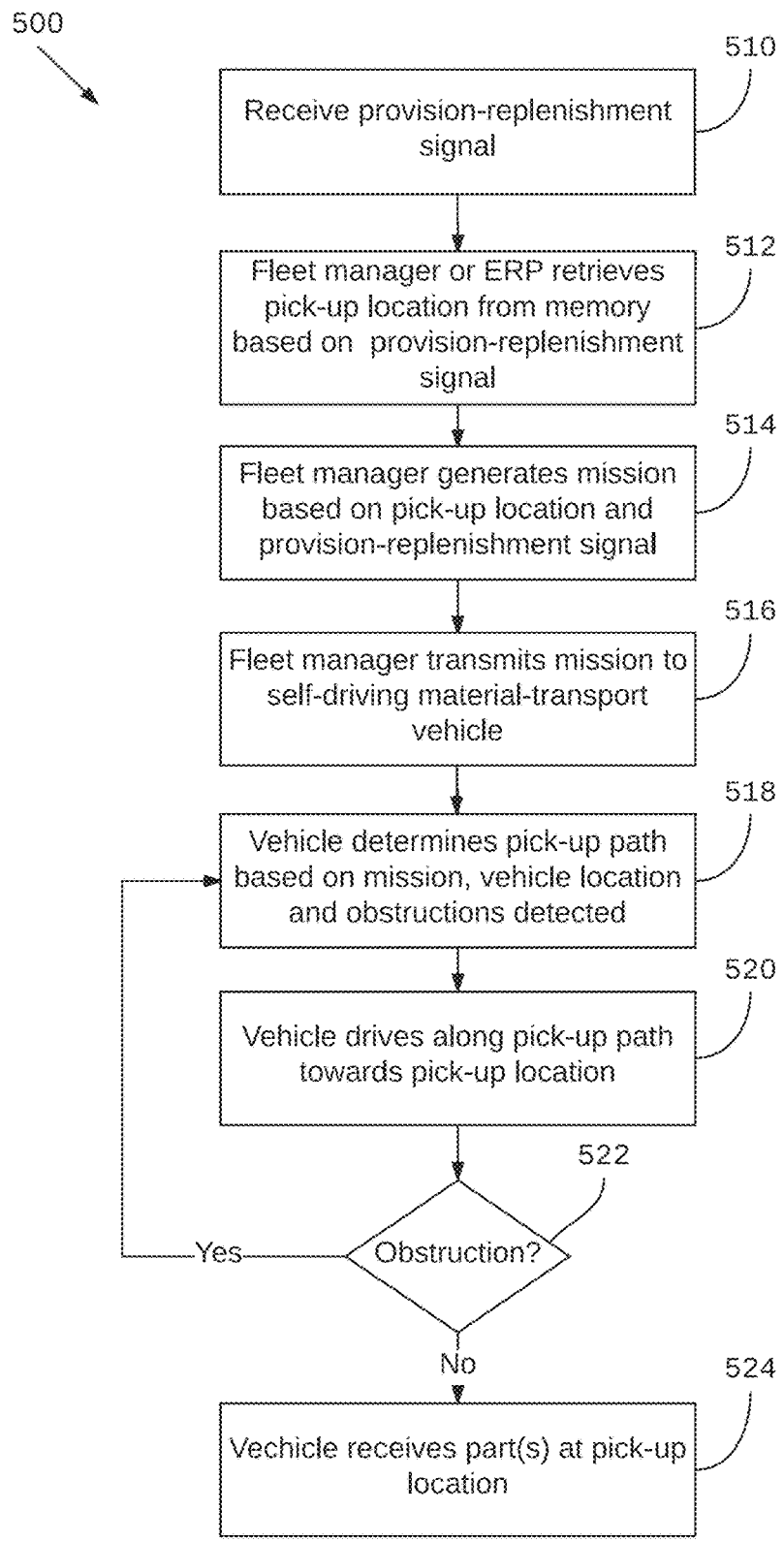
FIG. 5 is a flow diagram of a method for autonomous provision replenishment according to some embodiments.

Referring to FIG. 5, there is shown a method 500 for autonomous provision replenishment according to some embodiments. The method begins at 510, when a provision-replenishment signal is received. Ultimately, the provision-replenishment signal and/or information associated with the provision-replenishment signal may be received by a fleet-management system (a.k.a. "fleet manager"). According to some embodiments, the provision-replenishment signal may first be sent to an enterprise resource planning system, as previously described.

According to some embodiments, the provision-replenishment signal includes any or all of an item identifier, and item type, a pick-up location, and a drop-off location.

At step 512, the fleet-management system and/or the enterprise resource planning system retrieves a pick-up location from memory based on the provision-replenishment signal. In the event that the provision-replenishment signal includes a pick-up location, then this step may involve relaying/retrieving the pick-up location that is already in memory from the received signal. In the event that the provision-replenishment signal does not include a pick-up location, this step may involve looking up a pick-up location associated with the item identifier (e.g. in a database or look-up table) on the enterprise resource planning system (or fleet-management system).

At step 514, the fleet-management system generates a mission based on the pick-up location. For example, the mission may include a pick-up location, a drop-off location, and a timing schedule (e.g. delivery time) by which an item should be delivered to the drop-off location.

At step 516, the fleet-management system transmits the mission to a self-driving material-transport vehicle. According to some embodiments, this includes transmitting the mission using a WiFi (e.g. IEEE 802.11) network.

At step 518, the vehicle uses the information pertaining to the mission in order to plan a path to the pick-up location. For example, this may include using a map of the vehicle's environment, stored on the vehicle, in order to find an optimal path from the vehicle's current location the pick-up location, while avoiding obstacles and considering known navigational issues such as slow zones or congestion zones.

At step 520, the vehicle uses the pick-up path that it autonomously determined during the previous step 518 to drive towards the pick-up location. According to some embodiments, while the vehicle is driving along the pick-up path, the vehicle's sensors are sensing the vehicle's environment in order to ensure that the vehicle is following the planned pick-up path, and also detect any unanticipated obstructions along the pick-up path.

If the vehicle determines that there is an obstruction on the pick-up path, then, at step 522, the method 500 returns to step 518 in order to update the pick-up path, thereby avoiding the detected obstruction. As such, the method 500 enables the vehicle to deviate from its original path, and to dynamically respond to changes in the vehicle's environment.

At step 524, the vehicle arrives at the pick-up location and receives the intended part(s) stored in an inventory with which the pick-up location is associated.

Figure 6:
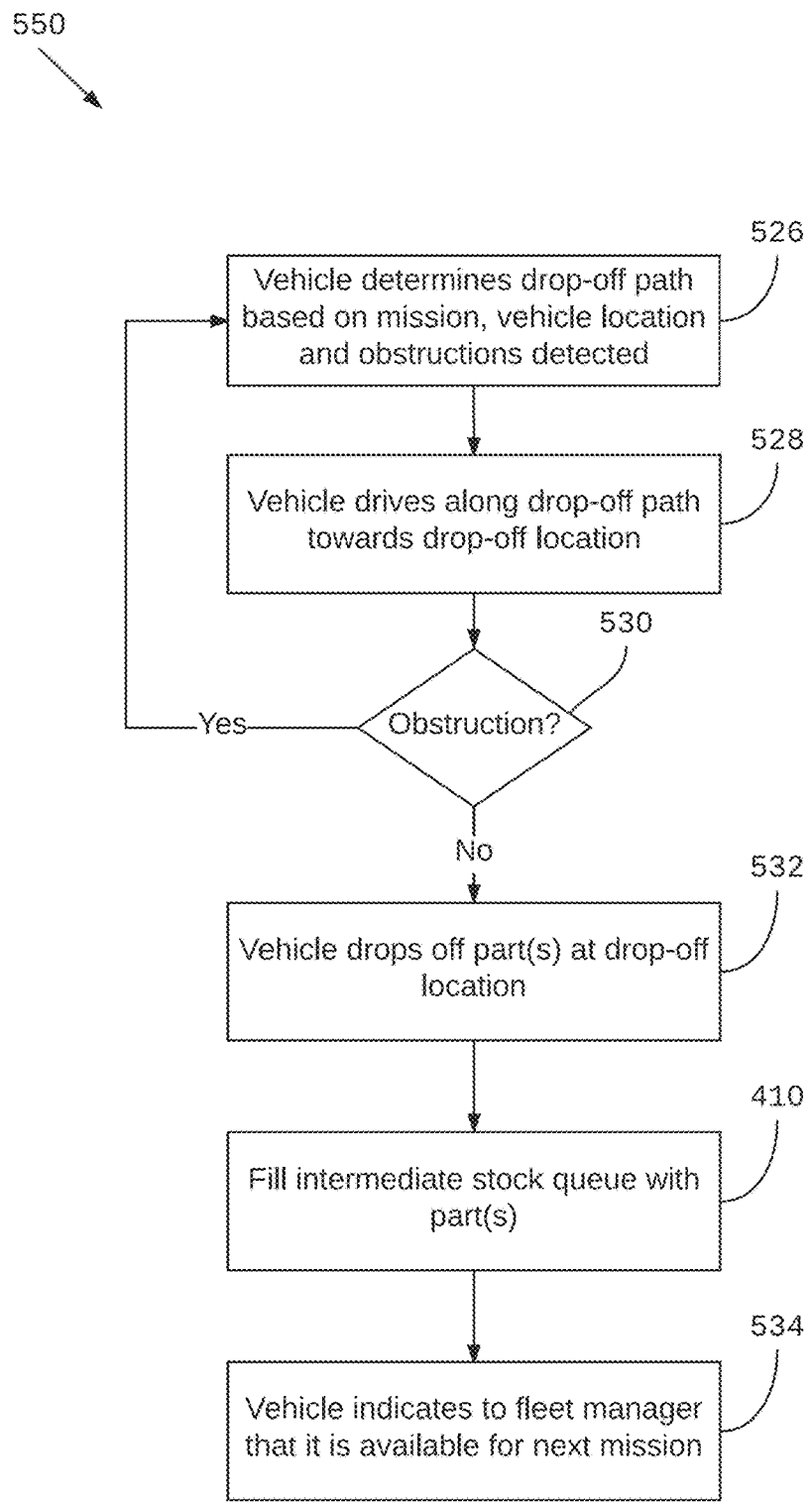
FIG. 6 is a flow diagram of a method for autonomous provision replenishment according to some embodiments.

Referring to FIG. 6, there is shown a method 550 for autonomous provision replenishment. According to some embodiments, the method 550 may be run in response to, as a part of, sequentially with, or otherwise complementary to the method 500.

At step 526, the vehicle determines a drop-off path based on a previously-received mission. For example, this may be the mission that was previously-transmitted by the fleet-management system during step 516 of method 500. The determination of the drop-off path follows the description of the determination of the pick-up path previously described.

At step 528, the vehicle drives along the drop-off path determined by the vehicle in the previous step 526 towards the drop-off location specified in the mission. As with the pick-up path, as the vehicle travels along the drop-off path, the vehicle's sensors sense the vehicle's environment to ensure that the vehicle is on the intended path, and to detect any unanticipated obstructions on the path.

If an obstruction is detected, then, at step 530, the method 550 returns to step 526 in order to plan an updated drop-off path towards the drop-off location while avoiding the detected obstruction.

According to some embodiments, at 530 (and/or at step 522 in the method 500 shown in FIG. 5), the method may additionally report the obstruction back to the fleet manager so that the obstruction can be shared with other vehicles in a vehicle fleet, for example, in relation to the maps stored on the vehicles. As such, other vehicles in the feet can use knowledge of the obstruction in order to subsequently plan their own paths.

At step 532, the vehicle drops off its payload (e.g. parts) at the drop-off location. For example, the parts may be the parts received at step 524 of method 500. Once the parts have been dropped off at the drop-off location, then, at step 410, the intermediate stocking queue is filled with parts (i.e. the queue is at its queue limit). Subsequently, at step 534, the vehicle may indicate to the fleet manager that it has finished its mission, and is therefore available for a subsequent mission.

Figure 7:
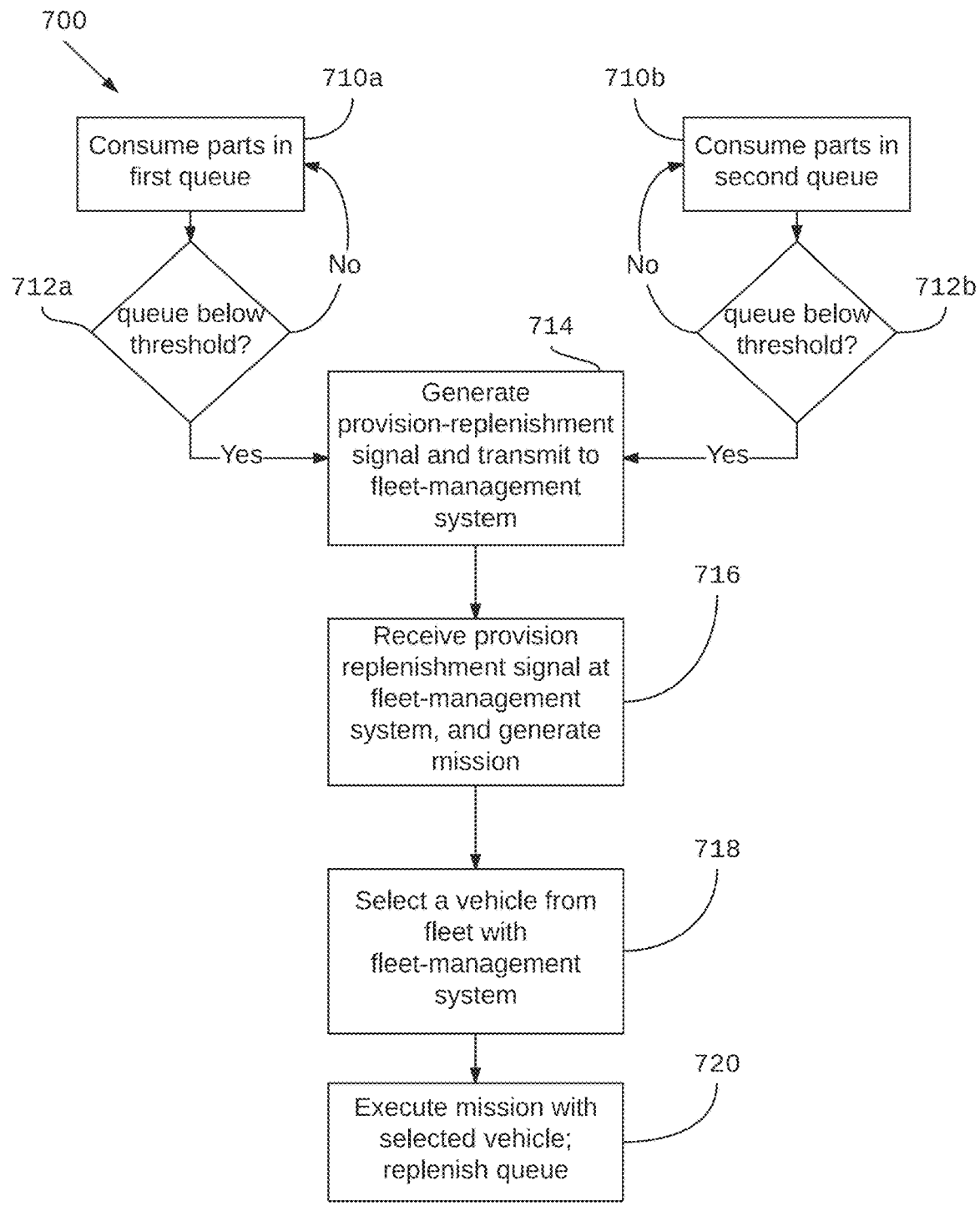
FIG. 7 is a flow diagram of a method for autonomous provision replenishment according to some embodiments.

Referring to FIG. 7, there is shown a method 700 for autonomous provision replenishment, according to some embodiments. The method 700 can be implemented using two or more intermediate stocking queues, though two are shown for the sake of explanation. In other words, the method 700 can be implemented in order to provide autonomous provision replenishment to a manufacturing process that uses multiple parts that require delivery via intermediate stocking queues.

The method 700 begins at step 710a when a part is consumed in an intermediate stocking queue. At an unrelated time, during any stage of the method 700, at step 710b, a part is consumed in a second intermediate stocking queue.

The method 700 may continue to iterate through step 710a via step 712a, and through step 710b via step 712b until the part count in either of the queues is below a provisioning threshold. For the sake of example, it will be assumed that the part count in the first queue becomes lower than the replenishment threshold first, prior to that of the second queue. According to some embodiments, the replenishment threshold for the first queue is not necessarily equal to the replenishment queue for the second queue.

At step 712a, the method 700 determines that the part count in the first queue is below the replenishment threshold for the first queue, and the method proceeds to the step 714. In this example, as the method 700 proceeds to step 714, the method 700 simultaneously continues to iterate through step 710b via step 712b at the second queue.

At step 714, a provision-replenishment signal is generated in accordance with the first queue (that is, the provision-replenishment signal may be based on any or all of the part identifier associated with the first queue, the part type associated with the first queue, the pick-up location associated with the part type associated with the first queue, and the drop-off location associated with the first queue). As previously described, the provision-replenishment signal is transmitted to the fleet-management system.

At step 716, the provision-replenishment signal is received at an enterprise resources planning system and/or fleet-management system, and the fleet-management system generates a mission based on the provision-replenishment signal.

At some independent time, as parts continue to be consumed from the second queue, the part count at the second queue may be below the replenishment threshold of the second queue. In this event, the method proceeds from step 712b to step 714, while still continuing to simultaneously execute according to previously-determined provision-replenishment signals. In other words, the method 700 can execute any of the steps of the method 700 simultaneously, since, at any given time, the part count in queue can fall below the replenishment threshold, thereby starting a new iteration of the method 700 from step 714.

Once the mission has been generated, then, at 718, a particular vehicle is selected from a fleet of vehicle. For example, a particular vehicle may be selected based on its current location and whether it is available for a new mission or currently executing a mission and thus unavailable. According to some embodiments, when a fleet of multiple vehicles is applied to a manufacturing process with multiple intermediate stocking queues, there is no long-term association between any particular vehicle and any particular intermediate stocking queue (or type of part). In other words, over the course of time, it is possible that, with subsequent iterations through 716, a single vehicle could be sent on missions to every pick-up location and drop-off location within the facility, and, similarly, it is possible that a single pick-up location or drop-off location could be served by every vehicle within the fleet over a series of vehicle selection decisions at step 718.

Once a particular vehicle has been selected from the fleet, then, at step 720 the fleet-management system transmits the mission to the selected vehicle. The selected vehicle then executes the mission, which results in the replenishment of the respective queue. Although a particular mission has been executed, the method 700 continues to run through subsequent iterations so long as the manufacturing processes continues to consume parts according to at least one of steps 710a and 710b.

Figure 8:
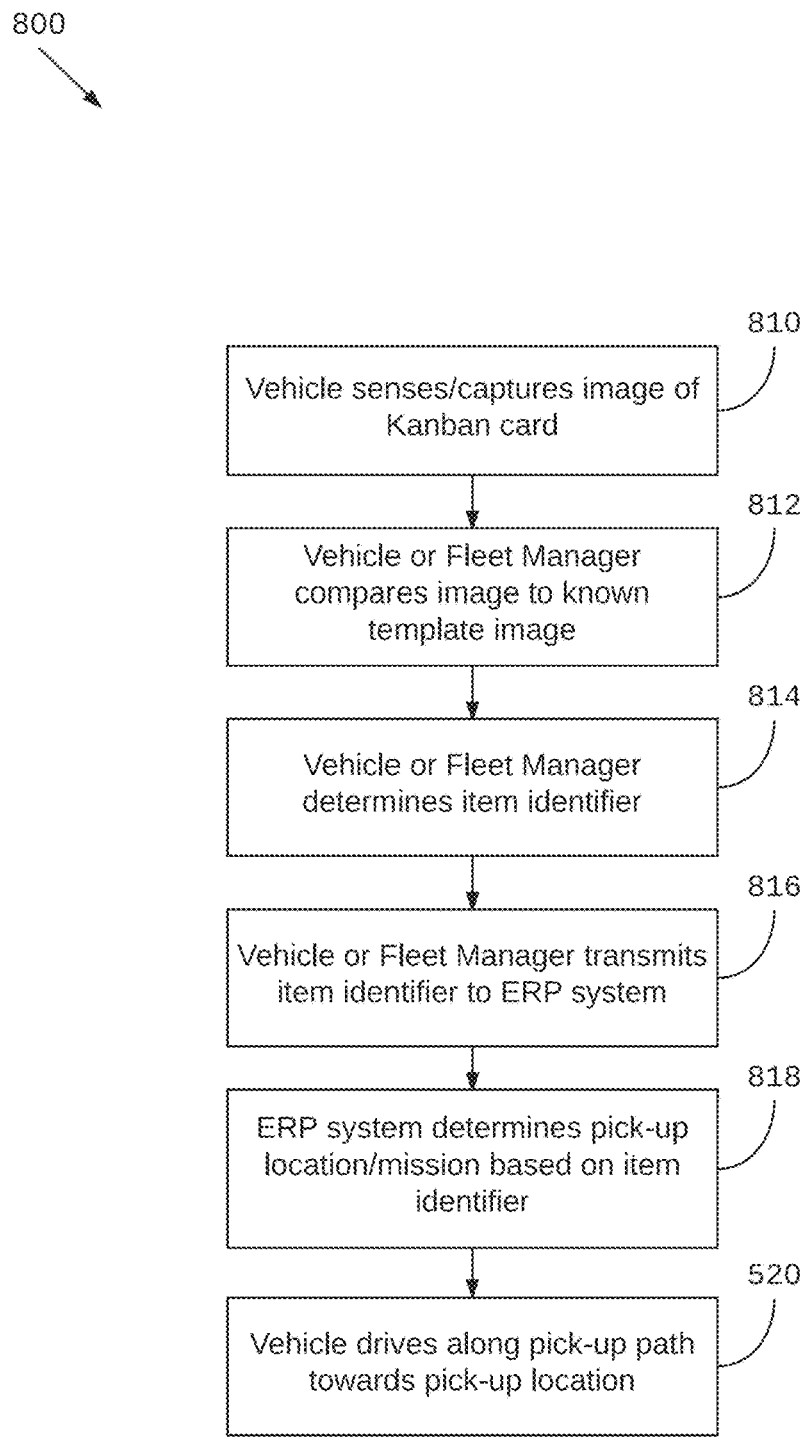
FIG. 8 is a flow diagram of a method for autonomous provision replenishment according to some embodiments.

Referring to FIG. 8, there is shown a method 800 for autonomous provision replenishment with a self-driving vehicle. The method 800 uses sensors on the vehicle in order to generate a provision-replenishment signal.

The method begins at step 810, when the vehicle senses (e.g. scans/reads) a provision-replenishment notice such as a Kanban card that has been posed on a provision-replenishment board such as a Kanban board. According to some embodiments, the Kanban card is posted on the Kanban board by a human operator. According to some embodiments, the Kanban card comprises a standard format such that information and/or the context of information (e.g. metadata) can be determined based on where the information is located on the card. According to some embodiments, the Kanban board comprises a standard format such that information and/or the context of information (e.g. metadata) can be determined based on where the Kanban card is located on the Kanban board.

According to some embodiments, the Kanban card comprises a bar code, and, during step 810, the optical sensors on the vehicle are used to scan the bar code.

According to some embodiments, the optical sensors on the vehicle may capture an image of the Kanban card and then compare the captured image to a known template. In some cases, the known template image may be stored locally on the vehicle such that the vehicle itself can compare the captured image to the known template. In some cases, the known template image may be stored at the fleet manager such that the vehicle transmits the captured image to the fleet manager so that the fleet manager compares the captured image to the known template. In some cases, the known template image may be stored at the enterprise resource planning system such that the vehicle transmits the capture image to the enterprise resource planning system (e.g. directly or via the fleet-management system) so that the enterprise resource planning system captures the captured image to the known template.

At step 814, the vehicle, fleet-management system, or enterprise resource planning system (as the case may be) determines an item identifier. For example, if, during step 810, the optical sensors of the vehicle scan a bar code or QR code on a Kanban card, then the item identifier can be directly determined (i.e. read directly from the bar code or QR code). If, during step 810, the optical sensors of the vehicle capture an image of the Kanban card or Kanban board, then the item identifier may be determined by comparing the captured image with the known template. In the case that the Kanban board uses a standard format, then it may be possible to determine the item identifier based on where on the Kanban board a particular Kanban card has been placed. If the Kanban card uses a standard format, then it may be possible to determine the item identifier based on where on the Kanban card a particular mark, symbol, or writing has been placed.

At step 816, the item identifier may be transmitted to the enterprise resource planning system (or fleet-management system). For example, if the item identifier is determined by the vehicle, then item identifier may be transmitted to the enterprise resource planning system directly or via the fleet-management system. If the item identifier is determined by the fleet-management system, then the item identifier may be transmitted to the enterprise resource planning system. If the item identifier is determined by the enterprise resource planning system, then, effectively, the item identifier has been transmitted to the enterprise resource planning system.

According to some embodiments, any of the described attributes or functions of the enterprise resource planning system may be provided by the fleet-management system.

At step 818, a pick-up location is determined in association with the item identifier. For example, the enterprise resource planning system may look up the pick-up location associated with the item identifier. According to some embodiments, the pick-up location may be determined by the vehicle itself and/or the fleet-management system, for example, by downloading the necessary data (databases, tables, etc.) from the enterprise resource planning system.

According to some embodiments, during step 818, the vehicle may effectively assign itself a mission (e.g. as may be relevant with respect to step 518 in the method 500 shown in FIG. 5).

After step 818, the method 800 may proceed to step 520 (e.g. as provided by the method 500), as previously described.

Figure 9:
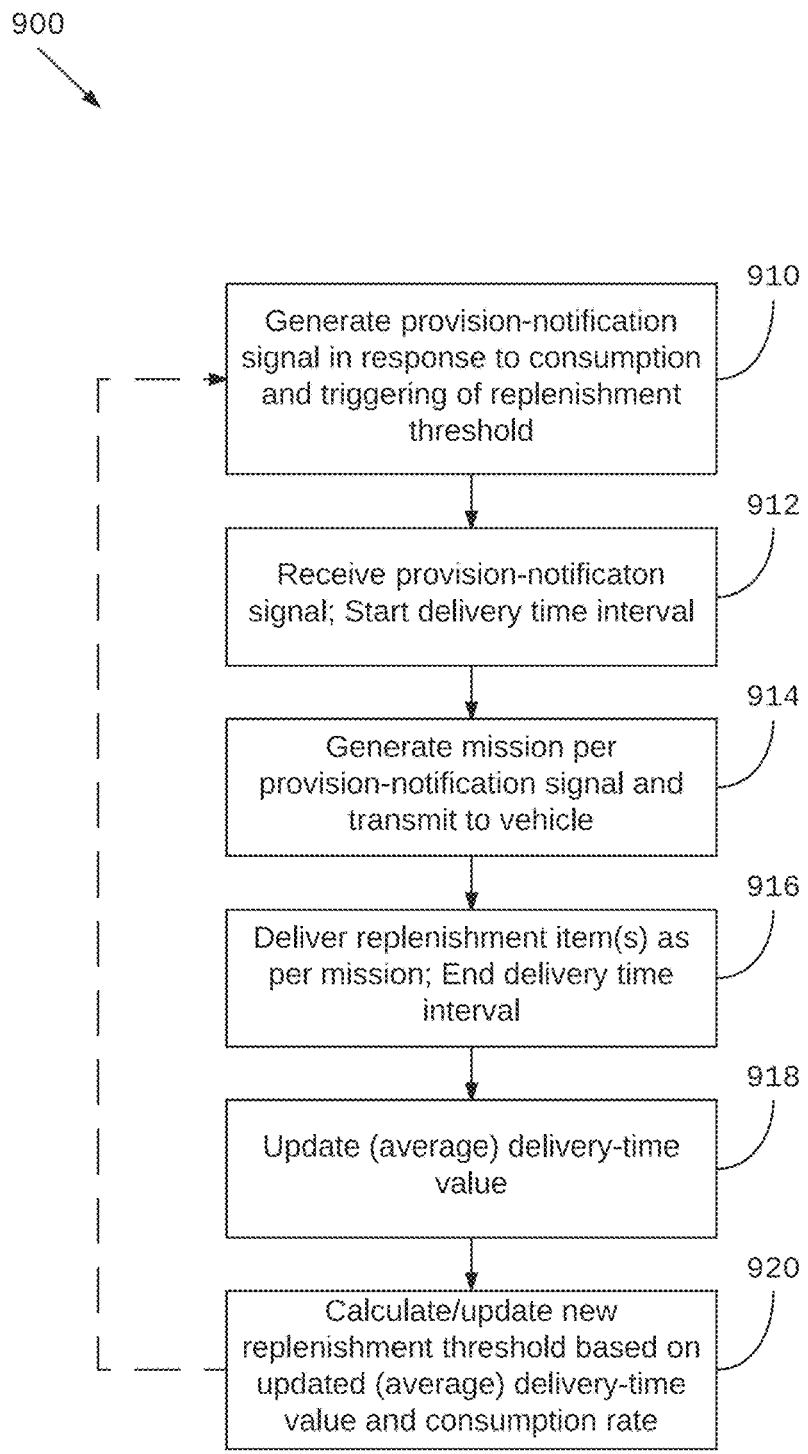
FIG. 9 is a flow diagram of a method for configuring an intermediate stocking queue in a manufacturing process according to some embodiments.

Referring to FIG. 9, there is a method 900 for configuring an intermediate stocking queue in a manufacturing process.

The method 900 begins at step 910, when a provision-notification signal is generated, for example, as previously described. According to some embodiments, the provision-notification signal may be generated in response to an item being consumed from an intermediate stocking queue, such that the number of items in the queue becomes equal to or less than a replenishment threshold. In other words, the provision-notification signal is generated based on a previously-determined replenishment threshold. For example, the previously-determined replenishment threshold may be arbitrarily determined (such as a "best guess" or starting point), and/or the previously-determined replenishment threshold may have been calculated based on previous iterations of the method 900.

At step 912, the provision-notification signal is transmitted from a provision-notification station and received by a fleet-management system (and/or an enterprise resource planning system). The reception of the provision-notification signal is associated with the start time of a delivery time interval. According to some embodiments, the fleet-management system and/or the enterprise resource planning system may generate and assign a time stamp based on receiving the signal. According to some embodiments, the provision-notification signal may include a time stamp indicating when the provision-notification signal was generated, or when the item was consumed. The time stamp may generally be used to indicate the start of a delivery time interval, which provides a measurement or estimate of the time required for the intermediate stocking queue to be replenished after an item is consumed that triggers the replenishment threshold.

At step 914, a mission is generated in accordance with the provision-notification signal. According to some embodiments, the mission is generated in accordance with the previously-described methods. According to some embodiments, step 914 may include the selection of a particular vehicle from within a fleet of vehicles, for execution of the mission. The mission is transmitted to a selected vehicle from the fleet-management system.

At step 916, the vehicle executes the mission, which results in the delivery of replenishment items to the intermediate stocking queue. A time associated with the delivery is recorded in order to indicate the end of the delivery time interval. According to some embodiments, the vehicle may send a signal to the fleet-management system to indicate that the delivery has been made. According to some embodiments, a human operator may record the delivery. In some cases, the fleet-management system and/or human operator may generate a time stamp in order to record the end of the delivery time interval.

At step 918, a new delivery-time value is calculated, and the existing delivery-time value is updated accordingly. According to some embodiments, the delivery-time value may be calculated as an average of delivery time intervals from previous iterations of method 900.

At step 920, a new replenishment threshold is calculated based on the updated delivery-time value. According to some embodiments, the replenishment threshold may be calculated as the product of the delivery-time value and the rate of consumption from the intermediate stocking queue.

The previously-determined replenishment threshold (as was used in step 910) can then be updated/replaced based on the replenishment threshold calculated in step 920. As indicated by the dashed line in FIG. 9, the replenishment threshold calculated in step 920 becomes the replenishment threshold used in the subsequent iteration through step 910. Based on the availability of measured delivery time intervals measured by the fleet-management system, it is possible to improve the efficiency of the autonomous replenishment system and methods (and, in some cases, the efficiency of the manufacturing process itself) by configuring the intermediate stocking queues so that the replenishment threshold is no higher than necessary.

The present invention has been described here by way of example only. Various modification and variations may be made to these exemplary embodiments without departing from the spirit and scope of the invention, which is limited only by the appended claims.

We claim:

1. A system for autonomous provision replenishment, comprising:
   one or more self-driving vehicles operable to:
      count a number of items at a stocking queue of a manufacturing process;
      transmit a provision-replenishment signal in response to determining that the number of items at the stocking queue does not satisfy a replenishment threshold; and
      executing a replenishment mission received from a fleet-management system; and
   the fleet-management system in communication with the one or more self-driving vehicles, the fleet-management system having a processor operable to:
      receive the provision-replenishment signal from the self-driving vehicle;
      generate the replenishment mission involving at least a pick-up location associated with the items and a drop-off location associated with the stocking queue;
      transmit the replenishment mission to the one or more self-driving vehicles;
      receive a confirmation signal from the one or more self-driving vehicles following completion of the replenishment mission by the one or more self-driving vehicles;
      adjust the replenishment threshold based on the provision-replenishment signal and the confirmation signal to generate an updated replenishment threshold; and
      transmit the updated replenishment threshold to the at least one self-driving vehicle operable to count the stocking queue.

2. The system of claim 1, wherein the at least one self-driving vehicle counts the number of items at the stocking queue using at least one sensor.

3. The system of claim 1, wherein the at least one sensor comprises at least one of an optical sensor, a camera, a barcode scanner, a QR code scanner, or an RFID reader.

4. The system of claim 1, wherein the at least one self-driving vehicle counts the number of items at the stocking queue by detecting identification information associated with each item.

5. The system of claim 4, wherein the at least one self-driving vehicle counts the number of items at the stocking queue by incrementing items joining the stocking queue and decrementing items leaving the stocking queue.

6. The system of claim 1, wherein the at least one self-driving vehicle counts the number of items at the stocking queue based on the mass of the items at the stocking queue.

7. The system of claim 1, wherein the at least one self-driving vehicle operable to count the stocking queue is further operable to complete the replenishment mission.

8. The system of claim 1, wherein the one or more self-driving vehicles comprise a first self-driving vehicle operable to count the stocking queue and a second self-driving vehicle operable to complete the replenishment mission.

9. The system of claim 1, wherein the replacement threshold is adjusted based on a replenishment time buffer associated with the replenishment threshold.

10. The system of claim 9, wherein the replacement time buffer is determined based on a consumption rate of the stocking queue.

11. A method for autonomous provision replenishment, comprising:
   operating at least one self-driving vehicle of one or more self-driving vehicles to:
      count a number of items at a stocking queue of a manufacturing process;
      transmit a provision-replenishment signal in response to determining that the number of items at the stocking queue does not satisfy a replenishment threshold; and
      execute a replenishment mission received from a fleet-management system; and
   receiving the provision-replenishment signal from the at least one self-driving vehicle;
   generating the replenishment mission involving at least a pick-up location associated with the items and a drop-off location associated with the stocking queue;
   transmitting the replenishment mission to the one or more self-driving vehicles;
   receiving a confirmation signal from the one or more self-driving vehicles following completion of the replenishment mission;
   adjusting the replenishment threshold based on the provision-replenishment signal and the confirmation signal to generate an updated replenishment threshold; and
   transmitting the updated replenishment threshold to the at least one self-driving vehicle.

12. The method of claim 11, wherein the at least one self-driving vehicle counts the number of items at the stocking queue using at least one sensor.

13. The method of claim 11, wherein the at least one self-driving vehicle counts the number of items at the stocking queue by detecting identification information associated with each item.

14. The method of claim 13, wherein the at least one self-driving vehicle counts the number of items at the stocking queue by incrementing items joining the stocking queue and decrementing items leaving the stocking queue.

15. The method of claim 11, wherein the at least one self-driving vehicle counts the number of items at the stocking queue based on the mass of the items at the stocking queue.

16. The method of claim 11 further comprising operating the one or more self-driving vehicles to complete the replenishment mission.

17. The method of claim 16, wherein the one or more self-driving vehicles operated to complete the replenishment mission comprise the at least one self-driving vehicle operated to count the stocking queue.

18. The method of claim 16, wherein the one or more self-driving vehicles comprise a first self-driving vehicle operated to count the stocking queue and a second self-driving vehicle operated to complete the replenishment mission.

19. The method of claim 11, wherein the replacement threshold is adjusted based on a replenishment time buffer associated with the replenishment threshold.

20. The method of claim 19, wherein the replacement time buffer is determined based on a consumption rate of the stocking queue.

* * * * *